United States Patent [19]

Kaburagi

[11] Patent Number: 5,206,843
[45] Date of Patent: Apr. 27, 1993

[54] APPARATUS FOR ERASING INFORMATION RECORDED ON AN INFORMATION RECORDING MEDIUM BY APPLYING LIGHT AND A MAGNETIC FIELD OVER A PLURALITY OF RECORDING TRACKS

[75] Inventor: Koji Kaburagi, Yokohama, Japan

[73] Assignee: Kabushiki Kaisha Toshiba, Kawasaki, Japan

[21] Appl. No.: 737,031

[22] Filed: Jul. 29, 1991

[30] Foreign Application Priority Data

Jul. 31, 1990 [JP] Japan .................. 2-203554

[51] Int. Cl.$^5$ .............. G11B 13/03; G11B 11/12; G11B 11/10
[52] U.S. Cl. ......................... 369/13; 360/59; 360/114; 369/112
[58] Field of Search .................. 369/13, 14, 110, 112, 369/116, 124, 109, 100, 121, 122, 94, 95, 102, 111, 117, 118; 360/59, 114

[56] References Cited

U.S. PATENT DOCUMENTS

| 4,853,912 | 8/1989 | Akasaka et al. | 360/59 |
| 4,984,224 | 1/1991 | Tsuyuguchi et al. | 360/114 |
| 4,984,225 | 1/1991 | Ando | 360/114 |
| 4,985,885 | 1/1991 | Saito et al. | 369/275.2 |
| 5,038,330 | 8/1991 | Tanaka | 360/114 |
| 5,056,081 | 10/1991 | Hsieh | 369/100 |

FOREIGN PATENT DOCUMENTS 2-126448 5/1990 Japan .

Primary Examiner—Hoa T. Nguyen
Attorney, Agent, or Firm—Finnegan, Henderson, Farabow, Garrett and Dunner

[57] ABSTRACT

An information recording medium processing apparatus including a light radiating device that uniformly radiates a light beam on a plurality of recording tracks of an information recording medium and a magnetic field applying unit that applies a magnetic field to a region of the information recording medium irradiated with the light beam, thereby simultaneously erasing information recorded in the plurality of recording tracks.

4 Claims, 6 Drawing Sheets

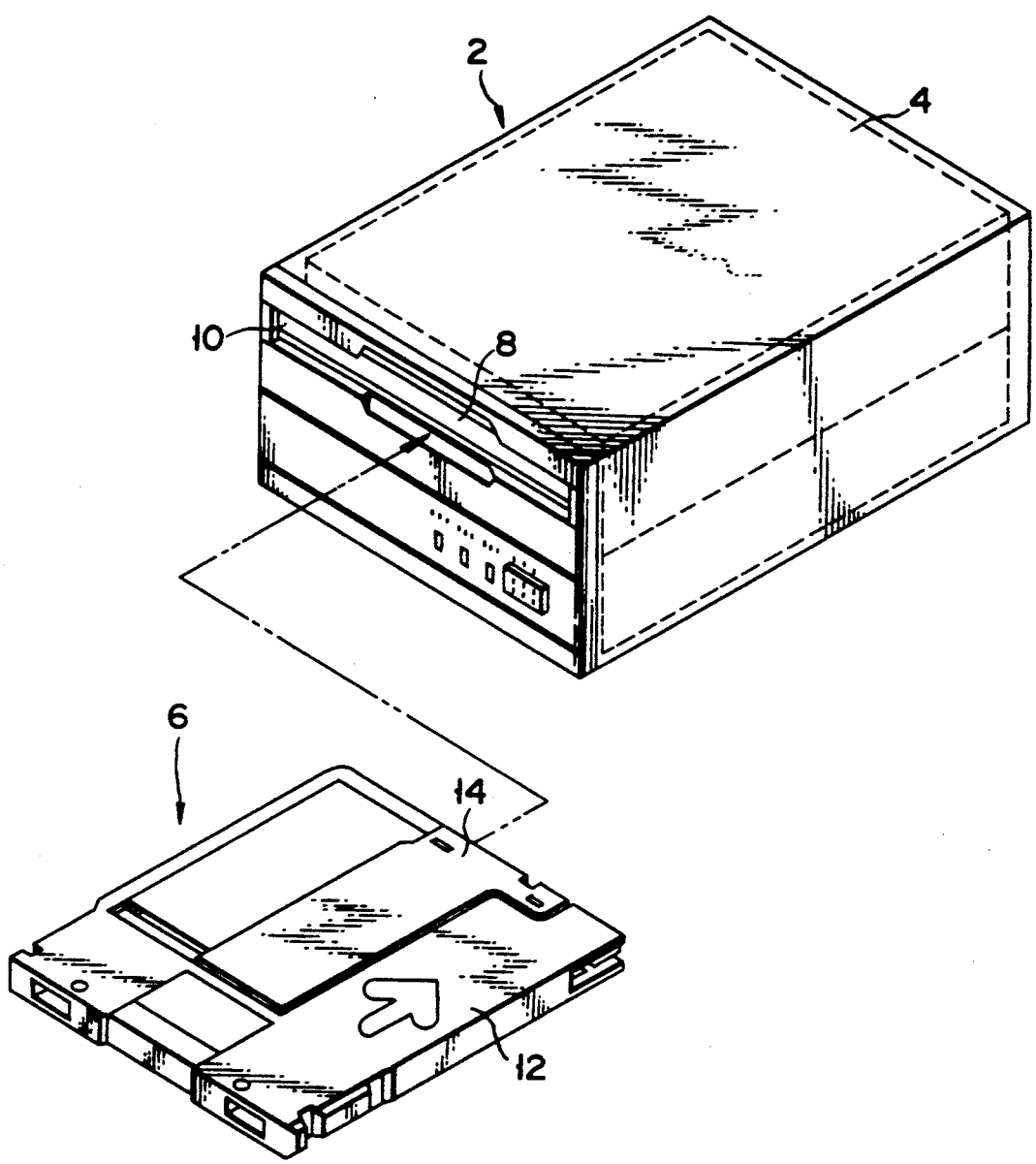
F I G. 1

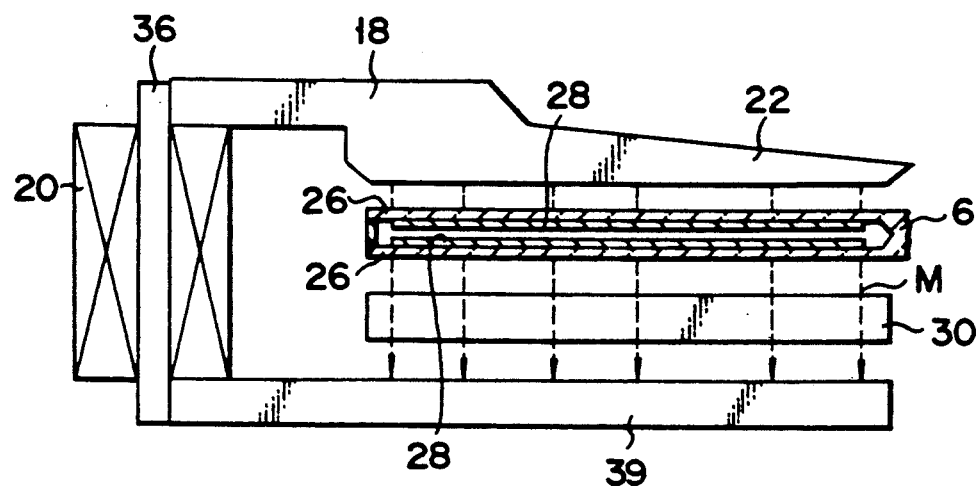
F I G. 6
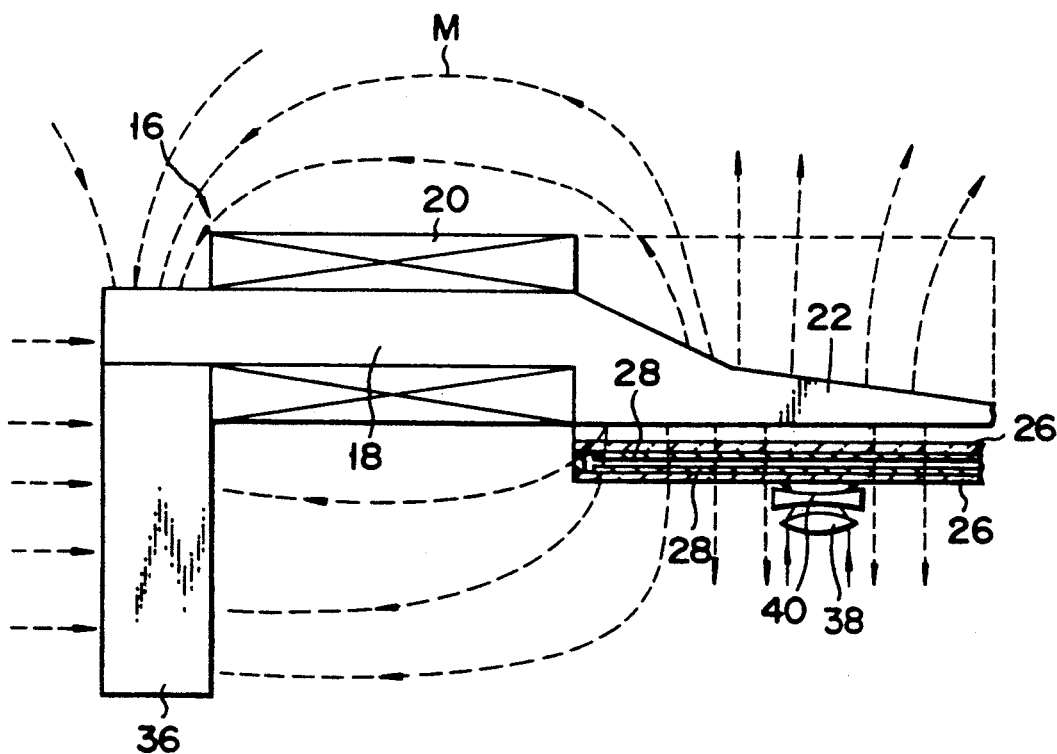
F I G. 7

APPARATUS FOR ERASING INFORMATION RECORDED ON AN INFORMATION RECORDING MEDIUM BY APPLYING LIGHT AND A MAGNETIC FIELD OVER A PLURALITY OF RECORDING TRACKS

BACKGROUND OF THE INVENTION

1. Field of the Invention

The present invention relates to an information processing apparatus for optically recording, reproducing, and erasing information using an optomagnetic effect.

2. Description of the Related Art

Various types of optomagnetic recording/reproduction apparatuses using optomagnetic media are available as information recording/reproduction apparatuses. Examples of the optomagnetic recording/reproduction apparatus of this type are an external memory of a computer, a rewritable video disk drive, an image file apparatus, a compact disk drive of a DAD type which can perform both reproduction and recording, and a rewritable high-density recording magnetic card.

The optomagnetic recording/reproduction apparatus comprises an optical head for recording, reproducing, and erasing information, a medium for recording information, and a magnetic field generator for applying a magnetic field.

The optomagnetic recording/reproduction apparatus is operated as follows. First, a static magnetic field is perpendicularly applied to a recording film surface of an information recording medium. A focused light beam is radiated on recording tracks on the recording film surface of the information recording medium to heat the recording film surface up to a temperature exceeding a Curie point or a temperature at which a coercive force is smaller than an external magnetic field. When the irradiated region of the recording film surface is heated, a magnetic moment of a magnetic domain in the region is inverted, thereby recording or erasing information.

In conventional apparatuses, however, a focused light beam is scanned on the recording tracks on the information recording film to perform erasure of information. Therefore, even when all of information recorded on the information recording film is to be erased, for example, a light beam must be radiated on and a magnetic field must be applied to each track, resulting in a very long erasure time.

SUMMARY OF THE INVENTION

The present invention has been made to solve the above conventional problems and has as its object to provide an information recording medium processing apparatus capable of radiating light on a plurality of tracks on an information recording medium to erase all of information recorded in the information recording medium within a short time period.

An information recording medium processing apparatus according to the present invention comprises an information recording medium having a plurality of recording tracks to be irradiated with light and applied with a magnetic field to enable recording, reproduction, and erasure of information, light radiating means for simultaneously radiating light on the plurality of recording tracks of the information recording medium upon erasure of the information, and magnetic field applying means for applying a magnetic field to a region of the information recording medium irradiated with light from the light radiating means.

In the information recording medium processing apparatus of the present invention, the light radiating means uniformly radiates a light beam on the plurality of recording tracks of the information recording medium, and the magnetic field applying means applies a magnetic field to a region of the information recording medium irradiated with the light beam, thereby simultaneously erasing information recorded on the plurality of recording tracks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing an information recording medium processing apparatus and a disk cartridge according to the present invention;

FIG. 6 is a view showing a first modification of the first embodiment of the information recording medium processing apparatus according to the present invention;

FIG. 7 is a view showing a second modification of the first embodiment of the information recording medium processing apparatus according to the present invention.

DETAILED DESCRIPTION OF THE PREFERRED EMBODIMENTS

An embodiment of the present invention will be described below with reference to the accompanying drawings.

Figure 2:
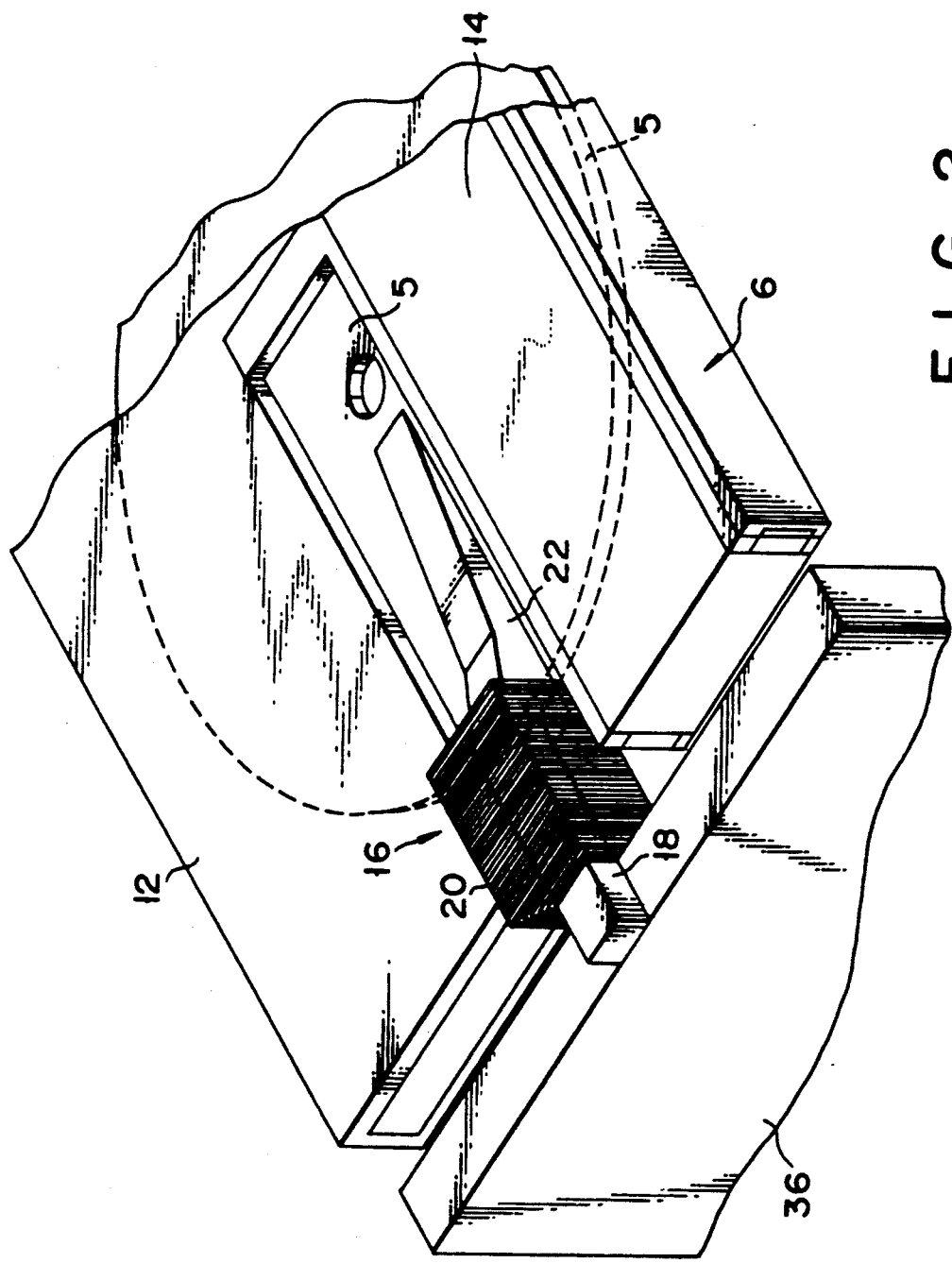
FIG. 2 is a sectional view showing the interior of the information recording medium processing apparatus according to the present invention.
Figure 3:
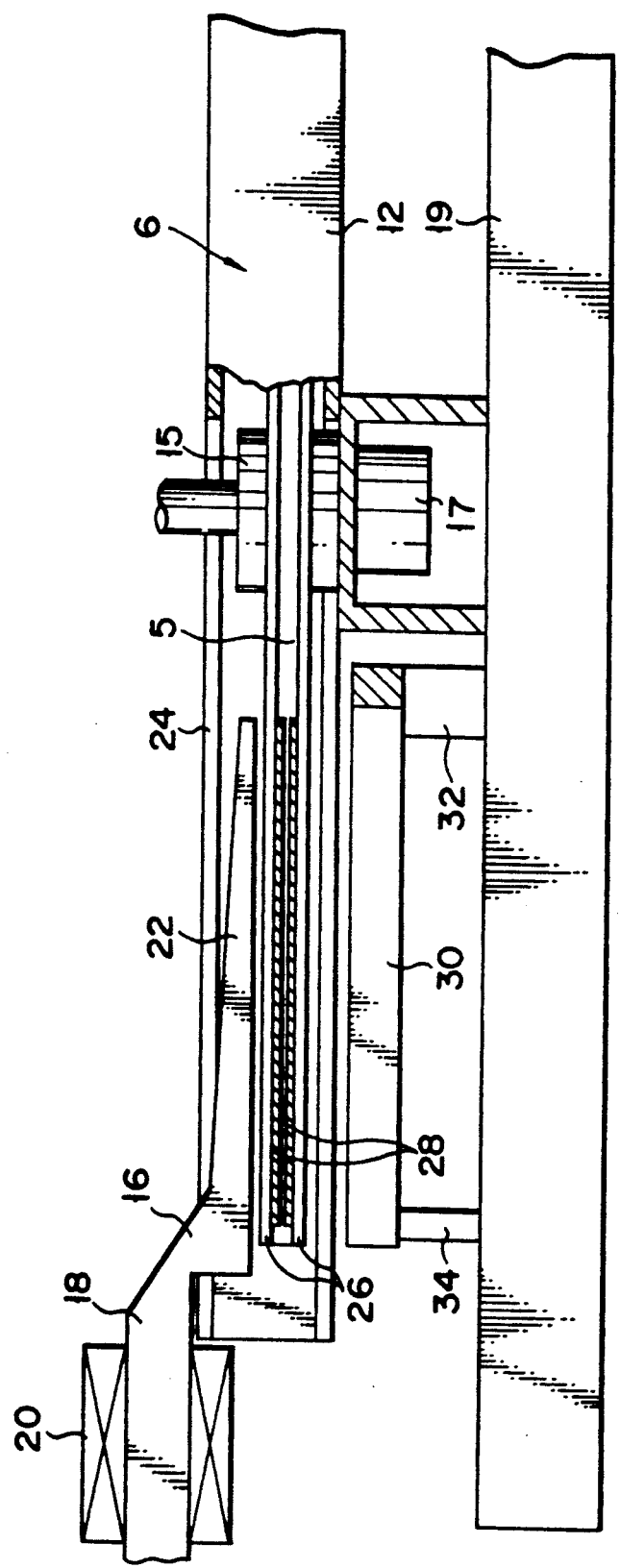
FIG. 3 is a view showing a state in which the information recording medium processing apparatus according to the present invention is arranged around a disk.

FIGS. 1 to 3 show an embodiment of an information recording/reproduction apparatus according to the present invention. This information recording/reproduction apparatus 2 has an upper plate 4 and a slot 8 for inserting a optomagnetic recording medium cartridge 12. The slot 8 is protected by a front cover 10. The optomagnetic recording medium cartridge 12 includes two optomagnetic disks 5 which are arranged face to face and are housed in the cartridge 12. The cartridge 12 has also a shutter 14 which can be opened and shut.

The optomagnetic recording medium 6 is inserted into the information recording/reproduction apparatus 2 through the slot 8 and placed on an objective lens 38 of an optical head by a conveyor mechanism (not shown) with shutter 14 opened. In result the optomagnetic recording medium 6 is kept in a standby mode. Thereafter, the optomagnetic recording medium 6 is used and removed through the slot 8 again.

FIGS. 2 and 3 show portions of the internal structure of the information recording/reproduction apparatus 2 according to the present invention, in each of which the optomagnetic recording medium 6 is housed in the information recording/reproduction apparatus 2. The optomagnetic disk 5 is clamped at its central hole by a clamp portion 15 and rotated by a motor (spindle motor) 17 connected to the clamp portion 15. The motor 17 is fixed on a base portion 19. The information recording/reproduction apparatus 2 incorporates a magnetic field generator 16. The magnetic field generator 16 has a square-pillar-like or plate-like magnetic core 18, a magnetic field coil 20 wound on the magnetic core 18, and a wedge-like magnetic core extending portion 22 extending from the magnetic core 18 and having a gradually decreasing thickness. The magnetic core 18 of the magnetic field generator 16 is detachably mounted on a yoke portion 36 as a pedestal. Upon insertion or removal of the optomagnetic recording medium 6, a magnetic flux output portion is separated from a yoke portion 36 and shifted upward. The wedge-like magnetic core extending portion 22 of the magnetic field generator 16 is inserted through an opening portion 24 of the optomagnetic recording medium 6 which is defined when the shutter 14 is opened. The magnetic field generator 16 is arranged to oppose the optomagnetic disk 5. In the optomagnetic disk 5, a pair of transparent base disks 26 are arranged with a predetermined interval therebetween, and each of the optomagnetic recording layers 28 is between the opposing surfaces of the transparent base disks 26. A light-emitter 30 opposing the optomagnetic disk 5 through the opening portion 24 is arranged on the base portion 19. In addition, the light-emitter 30 includes a supply portion 32 supplying a source and a light-emitter support jig 34 supporting light-emitter.

As the material of the transparent base disk 26, a transparent material which causes less degradation over time is preferred. For example, the material can be an acrylic resin such as polymethylmethacrylate or a polycarbonate resin or an epoxy resin or a styrene resin or glass. A continuous groove, a sampling servo mark, a preformat mark, and the like are formed on the transparent base disk 26 in accordance with a recording format.

The optomagnetic recording layer 28 consists of a material which changes its state upon radiation of a light beam. For example, the material can be chalcogenide-based amorphous semiconductor materials such as GeTe-based or TeSe-based or GeSbTe-based or TeOx-based or InSe-based or GeSbTe-based materials or compound semiconductor materials such as InSb-based or GeSb-based or or InSbTe-based materials. The optomagnetic recording layer 28 can be formed by a vacuum vapor deposition method or a sputtering method. A preferable layer thickness of the optomagnetic recording layer 28 is several nm to several um in practice.

Figure 4:
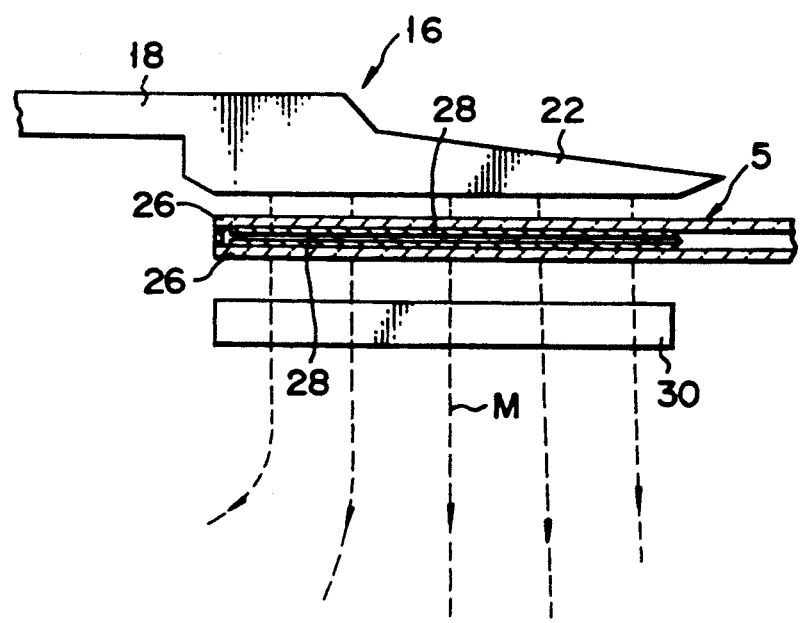
FIG. 4 is a sectional view schematically showing a relationship between a magnetic field generated by a magnetic field generator of the information recording medium processing apparatus of the present invention and a disk.
Figure 5:
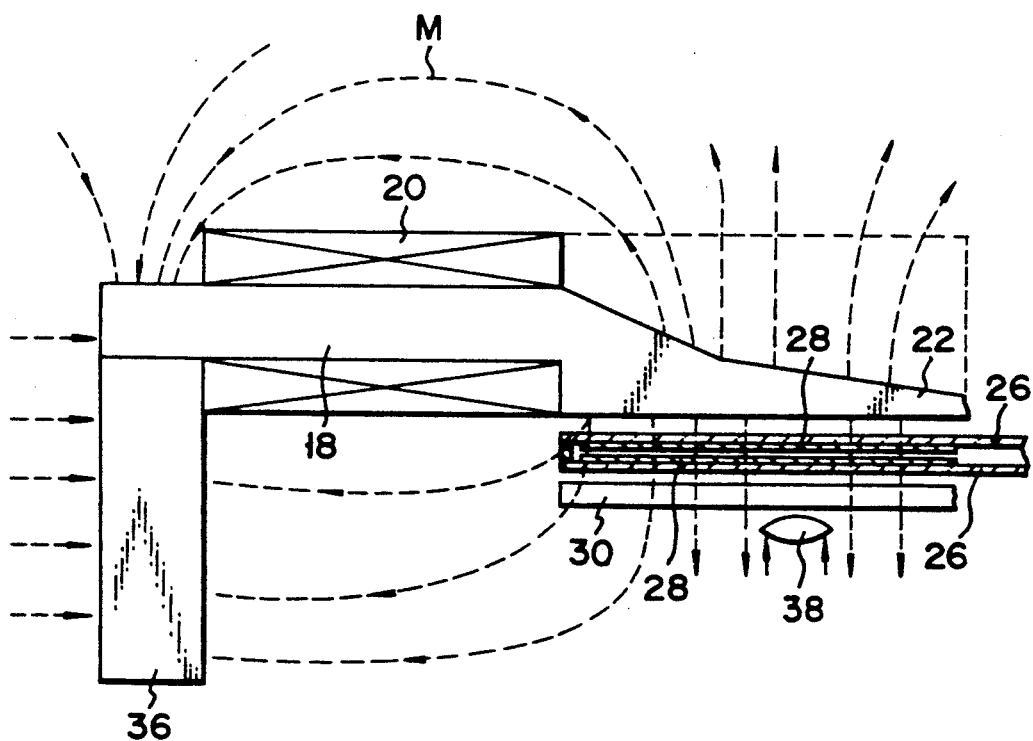
FIG. 5 is a sectional view showing the entire arrangement of the magnetic field generator of the information recording medium processing apparatus according to the present invention.

FIGS. 4 and 5 show a magnetic field M generated by the magnetic field generator 16. When the optomagnetic recording medium 6 is loaded in the information recording/reproduction apparatus 2, the magnetic field generator 16 is arranged as shown in FIG. 4.

States obtained when information is recorded in and erased from the optomagnetic recording medium will be described below.

The optomagnetic recording medium 6 has a structure in which the pair of transparent base disks 26 are bonded to oppose each other. The optomagnetic recording layers 28 are heaped up the opposing inner surfaces of the disks 26. Although the optomagnetic recording medium 6 is generally formed into a disk, the shape of the medium is not limited to this shape. For example, the optomagnetic recording medium 6 may have various shapes such as a card-like shape. In addition, the structure of the optomagnetic recording medium 6 is not limited to that shown in FIG. 2 but may be variously modified.

The magnetic field generator 16 has a structure which can be separated by a separating mechanism (not shown) so as not to interfere with movement of the optomagnetic recording medium 6 when it is inserted or removed.

While the optomagnetic recording medium 6 is housed in cartridge 12, a shutter 14 of the cartridge 12 is opened during the insertion operation mode. The cartridge 12 is loaded in to the information recording/reproduction apparatus, and the information recording medium 6 is supported so as to be rotated.

When the loading operation of the cartridge 12 is finished, the magnetic field generator 16 is moved downward through the shutter 14 to set an erasure or recording mode.

In this erasure mode or recording mode, the light-emitter 30 is caused to oppose the optomagnetic recording medium 6. In addition the light-emitter 30 emits light on to the radius direction all region of the recording layer 28 of the optomagnetic recording medium and the magnetic core extending portion 22 is extended to a position outside a range corresponding to regions on the recording layer 28 on which a light beam focused by the objective lens 38 can be radiated even if the objective lens 38 is moved on a guide mechanism, and the flat lower surface against the optomagnetic recording medium 6 of the extending portion 22 is caused to oppose the light beam radiation regions of the recording films 28.

In this state, the coil 20 is provided with a power to cause the coil 20 to generate a magnetic field. Since the electromagnetic coil 20 is in contact with the magnetic core extending portion 22, the magnetic field generated by the electromagnetic coil 20 is also radiated from the magnetic core extending portion 22. This magnetic field is radiated on the radius direction all region of the recording film 28.

Therefore, the magnetic field is substantially perpendicularly incident on the surface of the optomagnetic recording medium 6. The magnetic field passing through the optomagnetic recording medium 6 returns to the yoke portion 36 in contact with the magnetic core 18.

The light-emitter 30 as a light radiating means is arranged below the lower surface of the optomagnetic recording medium 6. A halogen lamp, for example, can be used as the light-emitter 30. The light-emitter 30 is arranged to oppose a region from the central portion to the outer peripheral portion of the optomagnetic recording medium 6. A light beam emitted from the light-emitter 30 is radiated on the region from the central to outer peripheral portions of the optomagnetic recording medium 6 along radius direction. Also, the light-emitter 30 is arranged to be movable along the radial direction of the optomagnetic recording medium 6. The light-emitter 30 is moved from a position below to the outside of the optomagnetic recording medium 6 upon recording of information and moved to the position below the optomagnetic recording medium 6 only upon erasure mode of information.

Information recorded on the optomagnetic recording medium 6 is erased by the following method. In the state shown in FIG. 4, the coil 20 is provided with a power to apply a magnetic field substantially perpendicularly to the recording layer 28 of the optomagnetic recording medium 6. In addition, a light beam is emitted from the light-emitter 30, and the optomagnetic recording medium 6 is rotated by rotation of the motor 17. When the optomagnetic recording medium 6 is rotated once, substantially the entire surface of the optomagnetic recording medium 6 passes through a region in which the magnetic field is distributed and a region in which the light beam is radiated. Therefore, when the temperature of a region of the optomagnetic recording medium 6 irradiated with the light beam is increased to exceed a Curie temperature, the magnetization direction of the magnetic layer is changed to a predetermined magnetic M direction to erase the information recorded on the optomagnetic recording medium 6.

As described above, upon erasure of information, the light-emitter 30 emits a light beam on a wide region (throughout the optomagnetic recording medium 6) from the central to outer peripheral portions of the optomagnetic recording medium 6. Therefore, the erasure operation can be rapidly carried out since the light beam is simultaneously radiated on a plurality of recording tracks.

Note that the present invention is not limited to the above embodiment but may be modified such that, as shown in FIG. 6, a light-emitter 30 is arranged between a magnetic core extending portion 22 and a yoke portion 36 and an optomagnetic recording medium 6 is loaded between the magnetic core extending portion 22 and the light-emitter 30. In this arrangement, a yoke extending portion 39 extends from the yoke portion 36. Also, the position of a coil 20 is changed. With this arrangement, a stronger magnetic field can be applied to an optomagnetic recording medium 6.

Figure 8:
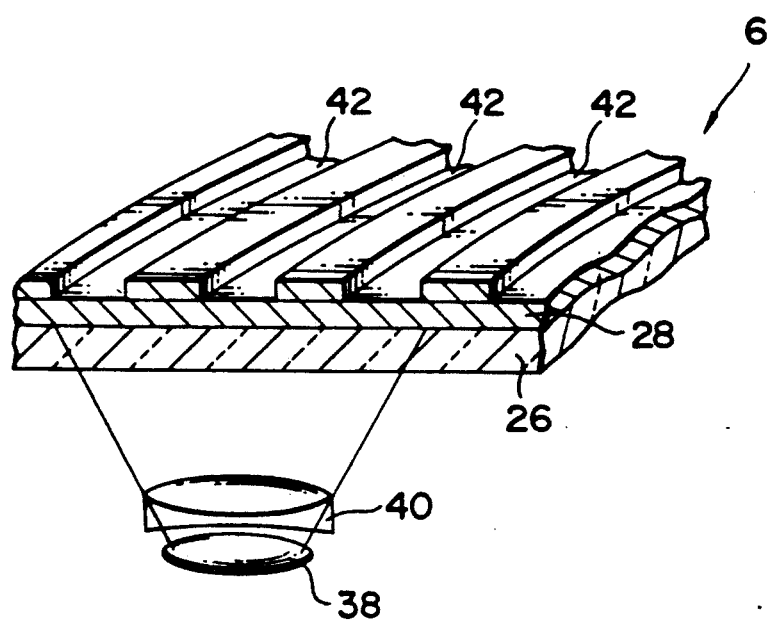
FIG. 8 is a perspective view showing a relationship between an optomagnetic medium and a lens of the second modification of the first embodiment of the information recording medium processing apparatus shown in FIG. 7.

In addition, the present invention can be modified as shown in FIGS. 7 and 8. Referring to FIGS. 7 and 8, in order to erase information throughout a plurality of tracks 42 in a general optomagnetic recording apparatus, a light beam through an objective lens 38 is diffused by a concave lens 40 arranged between the objective lens 38 and an optomagnetic recording medium 6. Therefore, since the light beam is radiated throughout the plurality of tracks, information can be erased throughout a wide region and an erasing time can be shortened.

Furthermore, replacing concave lens 40, the objective lens 38 may be detachably arranged from the pass of the light beam so that it can be removed upon erasure of information and the light beam is directly radiated on optomagnetic recording medium 6 without focusing.

Also, the objective lens 38 may be detachably arranged from the pass of the light beam so that it is removed and a light beam is diffused through the concave lens 40 upon erasure of information.

According to the information recording medium processing apparatus of the present invention, the light radiating means can radiate light on a plurality of tracks. As a result, a time required for erasure can be significantly shortened.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A processing apparatus for erasing information recorded on an information recording medium having a plurality of recording tracks on which the information is recorded by applying light and a magnetic field, comprising:

magnetic field applying means for applying the magnetic field to said plurality of recording tracks of said information recording medium, the magnetic field applying means including a substantially U-shaped member having two extending portions between which the information recording medium is positioned; and light radiating means for radiating the light on at least two tracks of said plurality of recording tracks having the magnetic field applied thereon by said magnetic field applying means, the light radiating means being positioned between the two extending portions of the magnetic field applying means and radiating the light on said at least two tracks simultaneously.

2. The apparatus according to claim 1, further comprising means for rotating said information recording medium.

3. The apparatus according to claim 2, wherein said light radiating means includes means for radiating the light on all regions of said plurality of recording tracks between a center of rotation of the information recording medium and a circumference of an information recording portion on said information recording medium.

4. The apparatus according to claim 1, wherein said magnetic field applying means includes a square-pillar-like magnetic core and a coil wound around said magnetic core.

* * * * *